United States Patent [19]
Shirley et al.

[11] Patent Number: 5,900,936
[45] Date of Patent: May 4, 1999

[54] METHOD AND APPARATUS FOR DETECTING RELATIVE DISPLACEMENT USING A LIGHT SOURCE

[75] Inventors: Lyle G. Shirley, Boxboro; Gregory Robert Hallerman, Pepperell, both of Mass.

[73] Assignee: Massachusetts Institute of Technology, Cambridge, Mass.

[21] Appl. No.: 08/957,396

[22] Filed: Oct. 23, 1997

Related U.S. Application Data

[63] Continuation of application No. 08/617,446, Mar. 18, 1996, abandoned.

[51] Int. Cl.⁶ .................................................. G01B 9/02
[52] U.S. Cl. ................................. 356/353; 356/358
[58] Field of Search .................... 356/345, 353, 356/354, 358

[56] References Cited

U.S. PATENT DOCUMENTS

| | | | |
|---|---|---|---|
| 3,881,105 | 4/1975 | De Lang et al. | 356/345 |
| 4,693,605 | 9/1987 | Sommargren | 356/351 |
| 4,781,455 | 11/1988 | Mächler et al. | 356/34 |
| 4,832,489 | 5/1989 | Wyant et al. | 356/359 |
| 5,026,162 | 6/1991 | Langdon | 356/354 |
| 5,237,390 | 8/1993 | Chaney | 356/345 |
| 5,357,337 | 10/1994 | Michon et al. | 356/345 |
| 5,455,670 | 10/1995 | Payne et al. | 356/1 |
| 5,699,158 | 12/1997 | Negishi | 356/358 |

OTHER PUBLICATIONS

Butters, Von J. N., "Using the Laser to Measure Length," *Materialprüf*, 24:245–248 (Jul. 7, 1982) (German Abstract).

Zou et al., "Two–Wavelength DSPI Surface Contouring Through the Temperature Modulation of a Laser Diode," *Optik*, 94(4):155–158 (1993).

Peng et al., "A Simplified Multi–Wavelength ESPI Contouring Technique Based on a Diode Laser System," *Optik*, 91(2)81–85 (1992).

Fercher et al., "Two–Wavelength Speckle Interferometric Technique for Rough Face Contour Measurement," *Optical Engineering*, 25(5):623–626 (May 1986).

Fercher et al., "Rough Surface Interferometry with a Two–Wavelength Heterodyne Speckle Interferometer," *Applied Optics*, 24(14):2181–1288 (Jul. 15, 1985).

Takeda et al., "Fourier–Transform Speckle Profilometry: Three–Dimensional Shape Measurements of Diffuse Objects with Large Height Steps and/or Spatially Isolated Surfaces," *Applied Optics*, 33(34):7829–7837 (Dec. 1, 1994).

Dresel et al., "Three–Dimensional Sensing of Rough Surfaces by Coherence Radar," *Applied Optics*, 31(7):919–925 (Mar. 1, 1992).

(List continued on next page.)

*Primary Examiner*—Robert Kim
*Attorney, Agent, or Firm*—Testa, Hurwitz & Thibeault, LLP

[57] ABSTRACT

An apparatus and method for measuring the surface deformation or displacement in objects. In one embodiment the apparatus includes an interference pattern generator which projects an interference pattern onto a detector mounted to the surface which is to be measured. As the surface deforms, the detector moves and sweeps across the interference pattern. By noting the changes in the light intensity, the deformation or displacement in the surface at the detector may be determined. In another embodiment, both the detector and the interference pattern generator are located on the surface and as the surface deforms, the relative change in the surface at the detector and the relative deformation or displacement of the surface at the interference pattern generator may be determined. In another embodiment a plurality of detectors and interference pattern generators are positioned to map the deformation or displacement of the surface at many locations on the surface.

18 Claims, 6 Drawing Sheets

OTHER PUBLICATIONS

Thalmann et al., "Dimensional Profiling by Electronic Phase Measurement," *SPIE Industrial Laser Interferometry*, 746:61–68 (1987).

Volotovskaya, N.K., "Relationship Between the Frequency and Angular Correlation Function of a Signal that is Scattered by an Extensive Body," *Radio Engineering and Electronic Physics J.* 16(6):1048–1049 (Jun. 1971).

Shirley et al., "Advanced Techniques for Target Discrimination Using Laser Speckle," *Massachusetts Institute of Technology, The Lincoln Laboratory J.*, 5(3):367–440 (1992).

Shirley, L. G., "Applications of Tunable Lasers to Laser Radar and 3D Imaging," *Technical Report 1025, Massachusetts Institute of Technology, Lincoln Laboratory*, (1995).

Naess, R. O., "A Measuring Interferometer For High Accuracy Alignment," Applied Optics, vol. 7, No. 11, Nov. 1968, pp, 2315–2317.

METHOD AND APPARATUS FOR DETECTING RELATIVE DISPLACEMENT USING A LIGHT SOURCE

This is a continuation of application Ser. No. 08/617,446 filed on Mar. 18, 1996, now abandoned.

GOVERNMENT SUPPORT

This invention was made with government support under Contract Number F19628-95-C-0002 awarded by the U.S. Air Force. The government has certain rights in the invention.

FIELD OF THE INVENTION

The invention relates to the field of metrology and more specifically to the measurement of surface displacement or deformation using non-contact methods.

BACKGROUND OF THE INVENTION

The non-contact measurement of the surface deformation or displacement in large structures is important when active or passive measures are employed to correct or compensate for the deformation or displacement. For example, a large parabolic surface which is utilized as the reflector of microwave or optical radiation in a microwave or optical telescope is subject to wind and temperature deformations and variations in sag due to dish orientation. To correct for the distortions caused by such deformations either mechanical actuators are used to selectively correct the surface so as to counter the unwanted deformation or mathematical techniques are applied to correct the received signal as reflected by the deformed surface.

Further, such measurements are useful in determining the reaction of many kinds of physical structures to the effects of load even if deformation compensation is not to be applied. For example, the deformation of a building due to wind shear, the deformation of a bridge under traffic load, and the deformation of an airplane wing under flight conditions are all important measurements for the purpose of maintenance and safety.

In each case the amount of surface displacement or deformation which may be very small in magnitude, must be measured precisely, both if the compensation to be applied is to be effective and if the behavior of the structure under load is to be compared with the predicted behavior. Laser range finders may be used in such situations because such range finders permit small displacements to be measured accurately and precisely. However, the cost of such range finders typically requires that one range finder be used to measure the displacement of a surface at multiple points on the surface. In such a case, the displacement or deformation at the various points on the surface is measured sequentially, thereby precluding an accurate measurement of the displacement or deformation of the surface at any point in time.

The present invention provides an inexpensive system for making accurate surface displacement or deformation measurements.

SUMMARY OF THE INVENTION

The invention relates to an apparatus and method for measuring the surface displacement or deformation in objects. In one embodiment the apparatus includes a fringe pattern generator which projects a fringe pattern onto a detector. The detector is mounted to the surface which is to be measured. As the surface deforms, the detector moves and sweeps across the fringe pattern. By noting the changes in the light intensity, the deformation or displacement of the surface may be determined. In another embodiment, both the detector and the fringe pattern generator are located on the surface and as the surface deforms, the relative change in the surface between the detector and the sources may be determined. In another embodiment a plurality of detectors and fringe generators are positioned to map the deformation or displacement of the surface at many locations on the surface.

In one embodiment the interference generator is a transmissive plate fringe generator with a laser light source. In another embodiment a plurality of transmissive plate fringe generators are located in close proximity to provide multiple fringe generators for a plurality of detectors located at locations on the surface to be measured.

BRIEF DESCRIPTION OF THE DRAWING

This invention is pointed out with particularity in the appended claims. The above and further advantages of this invention may be better understood by referring to the following description taken in conjunction with the accompanying drawings, in which:

FIG. 3b is a top view of the array of FIG. 3a;

DETAILED DESCRIPTION OF THE INVENTION

Figure 1:
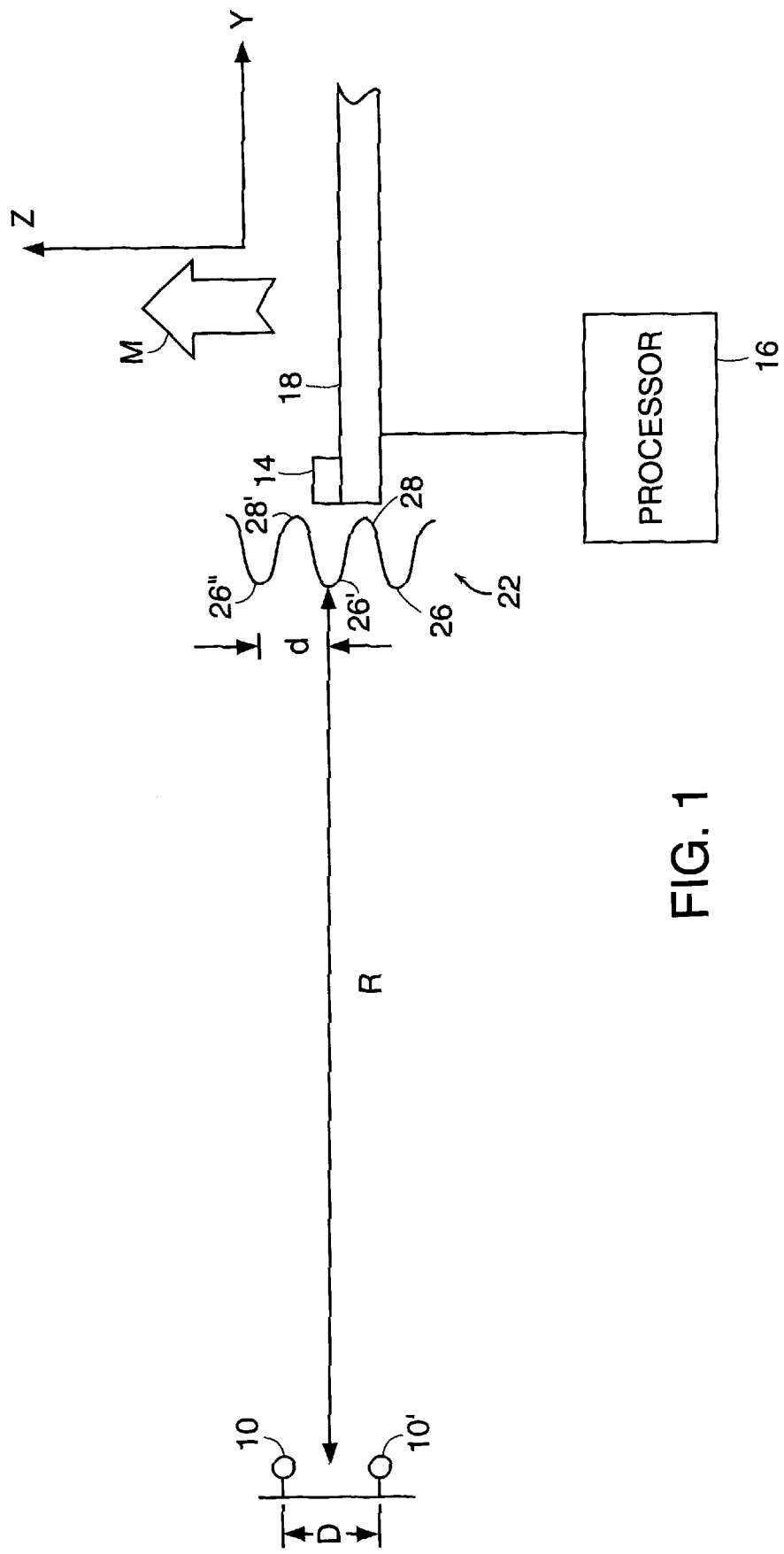
FIG. 1 is a highly schematic diagram of an embodiment of the invention.

In brief overview and referring to FIG. 1, one embodiment of the invention includes two coherent light sources 10, 10' separated by a distance D and located at a distance R from a detector 14 which is attached to the surface 18 whose deformation or displacement is to be measured. The two sources 10, 10' are herein collectively referred to as a fringe source or fringe generator and are contemplated to be held at a fixed distance apart. The output of the detector 14 is connected to a processor 16. The two sources 10, 10' produce an interference pattern 22 at the location of the detector 14. The interference pattern 22 consists of regions of varying light intensity (only three periods shown for clarity). The distance d between adjacent regions of equivalent intensity (The distance of one period.) is described by the equation:

$$d = \lambda R / D$$

where $\lambda$ is the wavelength of the light emitted by the sources 10, 10'.

As the surface 18 moves in the direction shown by arrow M, the detector 14 sweeps across the interference pattern. The detector 14 detects periodic light 26, 26', 26" and dark 28, 28' regions. If the amount of deformation or displacement is less than the spacing of the periods of the interference pattern, the detector 14 can determine the amount of deformation or displacement by determining the change in light intensity, as discussed in detail below. If the deformation or displacement exceeds one period, the number of light and dark periods or fringes can be detected and counted and the amount of deformation or displacement determined.

As an example, for a wavelength λ of 0.5 μm, a source separation D of 1.4 mm and a distance R from sources 10, 10' to detector 14 of 20 m, the resulting fringe spacing is 10 mm. Thus the deformation or displacement of the surface 18 would have to exceed 10 mm before fringe counting is necessary.

Although the apparatus is described in terms of the generation of an interference pattern, any device which is capable of projecting a pattern of periodic light and dark regions of accurately known spacing (hereinafter referred to generally as a fringe pattern) may be used as the source. For example a Moiré pattern generator may be used as the source.

Further, although the detector 14 is described above as being located on the surface 18 to be measured and the sources 10, 10' are located some distance from the detector 14 and the surface 18, it is also possible to locate the sources 10, 10' on the surface 18 to be measured, and the detector 14 some distance from the surface 18. Yet further, it is also possible to locate both the source 10, 10' and detector 14 on different parts of the surface 18.

Figure 2:
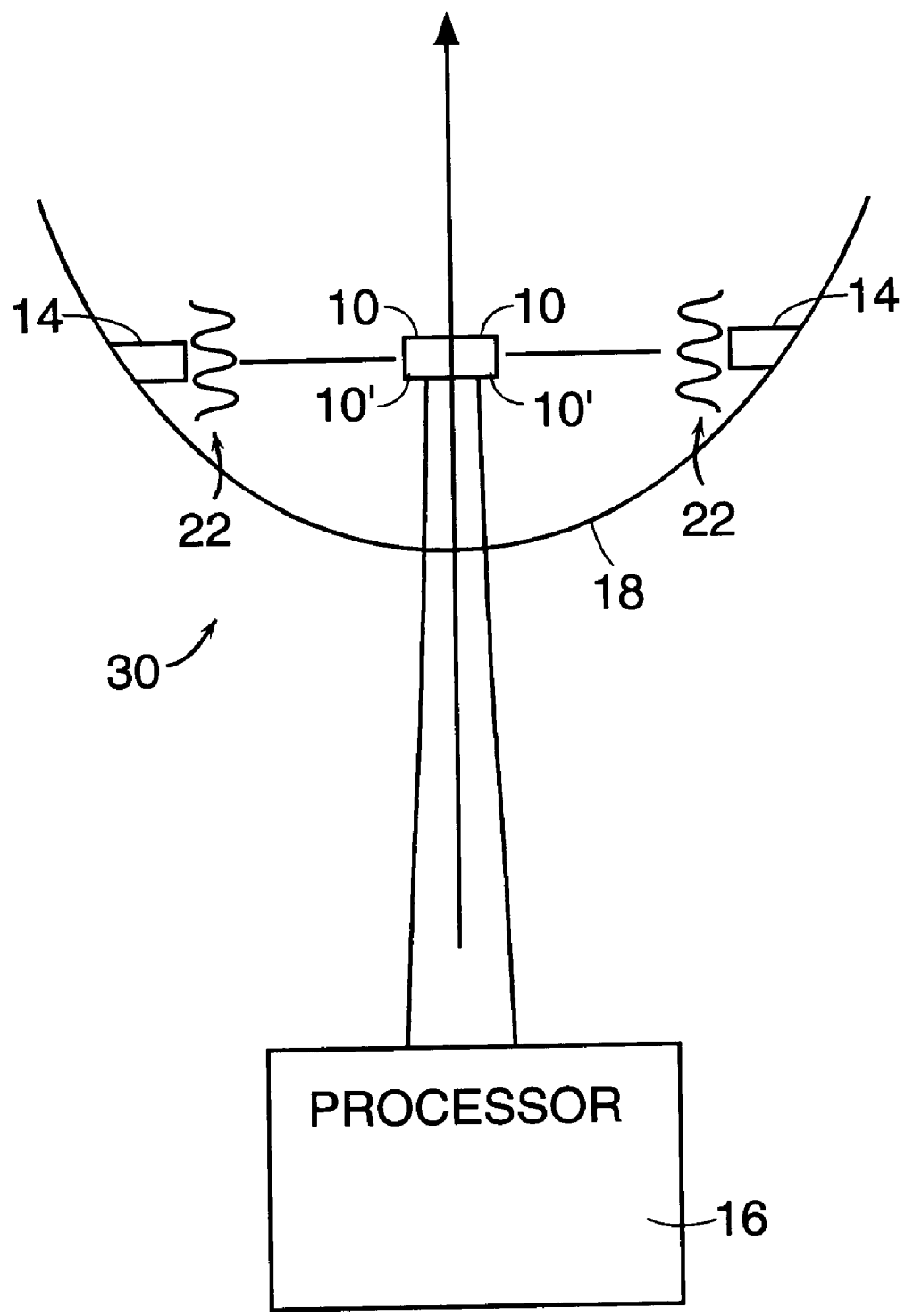
FIG. 2 is a highly schematic diagram of the embodiment of the invention of FIG. 1, used to measure the deformation of a parabolic reflector.

Referring to FIG. 2, an example of where this system may be used is in the determination of the deformation in a parabolic reflector 30. In the embodiment shown, a multiplicity of detectors, generally 14 (only two shown for clarity), and fringe sources, generally 10 (only four shown for clarity), are used to measure the deformation of various portions of the surface 18 of the reflector 30 simultaneously. By receiving signal data from all the detectors, generally 14, in response to the fringe pattern 22, simultaneously, the deformation of the surface 18 of the reflector 30 may be mapped.

Figure 3:
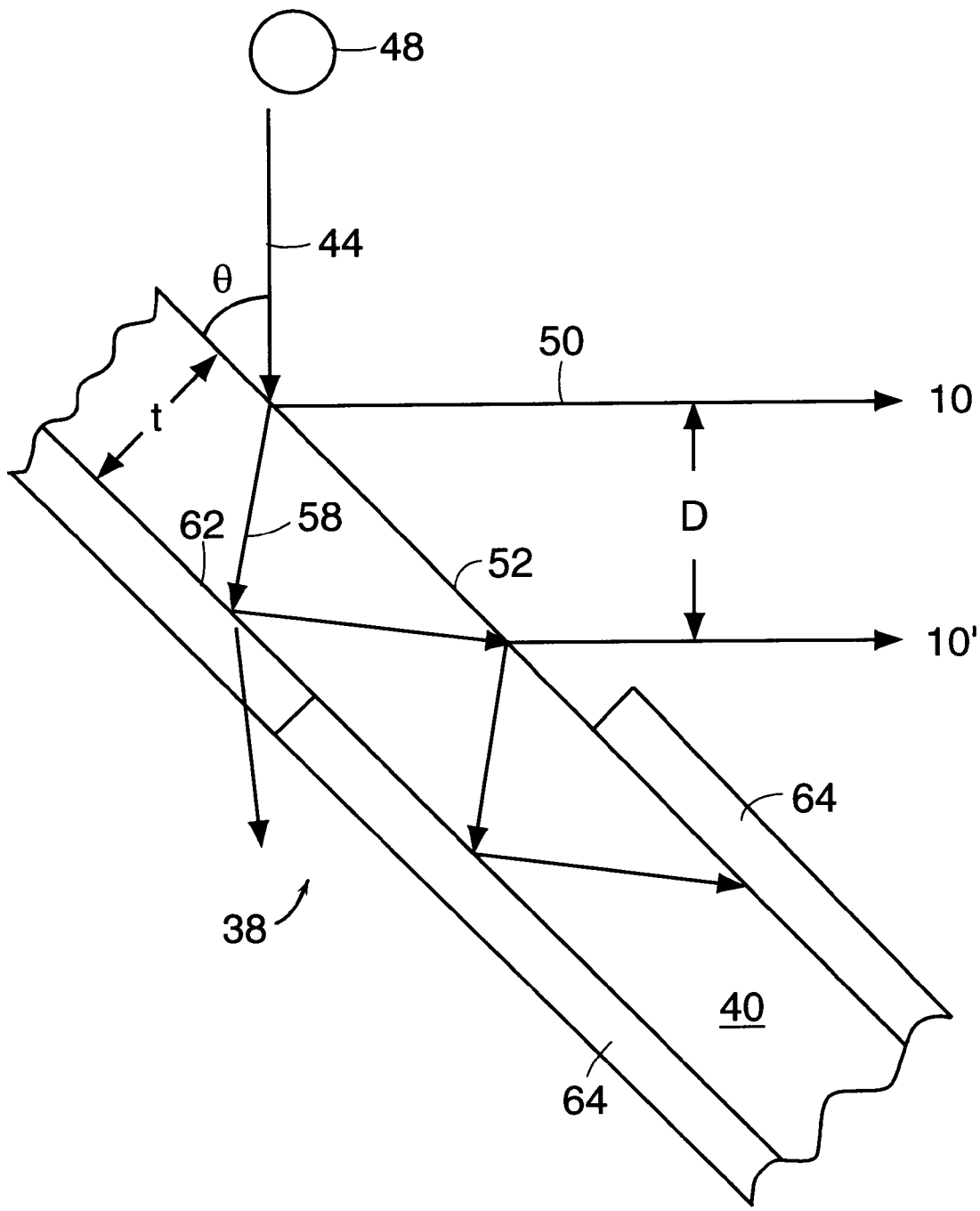
FIG. 3 is an embodiment of a transmissive plate fringe generator of the invention.

Referring to FIG. 3, although the embodiment of the invention is described using two coherent light sources 10, 10', a suitable source of coherent optical radiation may be obtained by using a transmissive plate interferometer 38. One embodiment of such an interferometer includes a glass plate 40 oriented at an angle θ to a laser beam 44 emitted by a laser 48. A portion 50 of the laser beam 44 is reflected by the surface 52 of the plate 40, while a portion 58 penetrates the plate 40 and is reflected by the other surface 62 of the plate 40. The result is that two coherent beams 50, 52 are formed which are transmitted to the detector 14. The two beams 50, 52 are separated by a distance D which is given by the equation:

$$D = [t\,\text{SIN}\,(2\theta)] / \sqrt{\eta^2 - (\text{SIN}^2\theta)}$$

where t is the thickness of the plate 40 and η is the index of refraction. Additionally two light shields 64, 64' may be provided to prevent the formation of additional beams as the light is internally reflected within the glass plate.

Figure 3A:
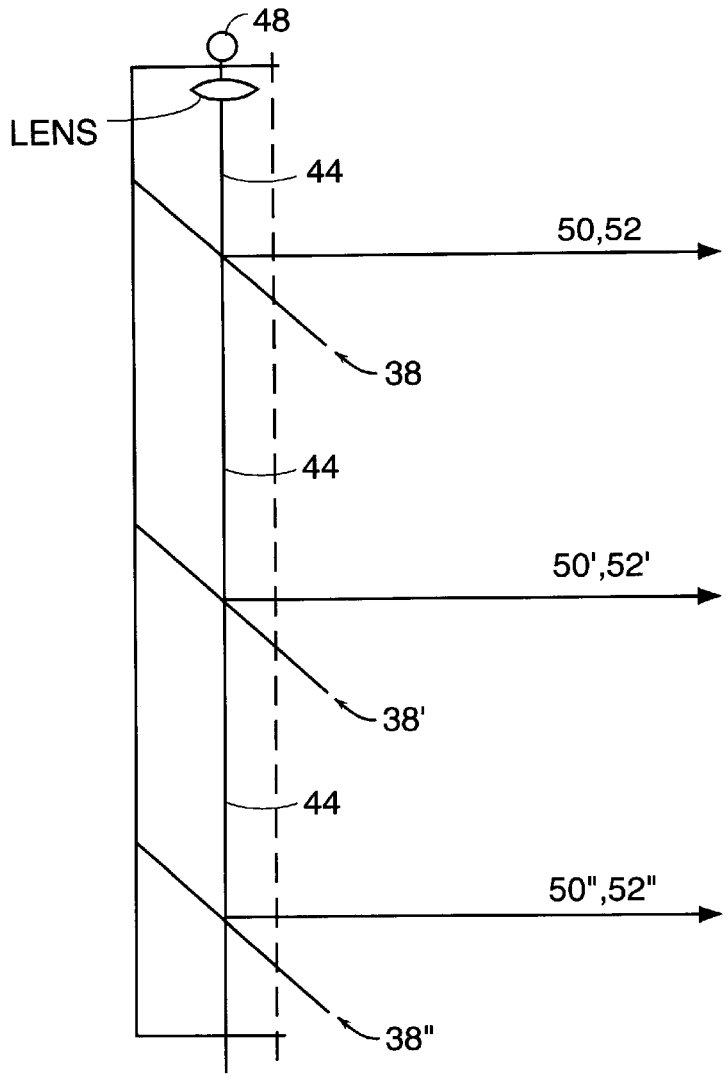
FIG. 3a is an embodiment of an array of transmissive plate fringe generators.
Figure 3B:
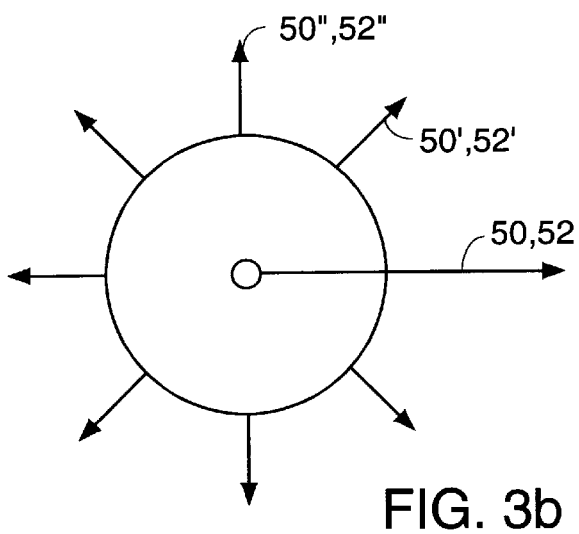

Referring to FIG. 3a, an embodiment of a plurality of transmissive plate interferometers of FIG. 3 located adjacent one another to produce a plurality of fringe patterns. In addition, the transmissive plates 38 may be oriented so as to project the light beams in different directions (see FIG. 3b).

In another embodiment a laser beam is passed through a cylindrical lens to narrow the beam prior to the beam entering the transmissive plate. In this way beam energy is concentrated in one dimension across one or more detectors 14.

Figure 4:
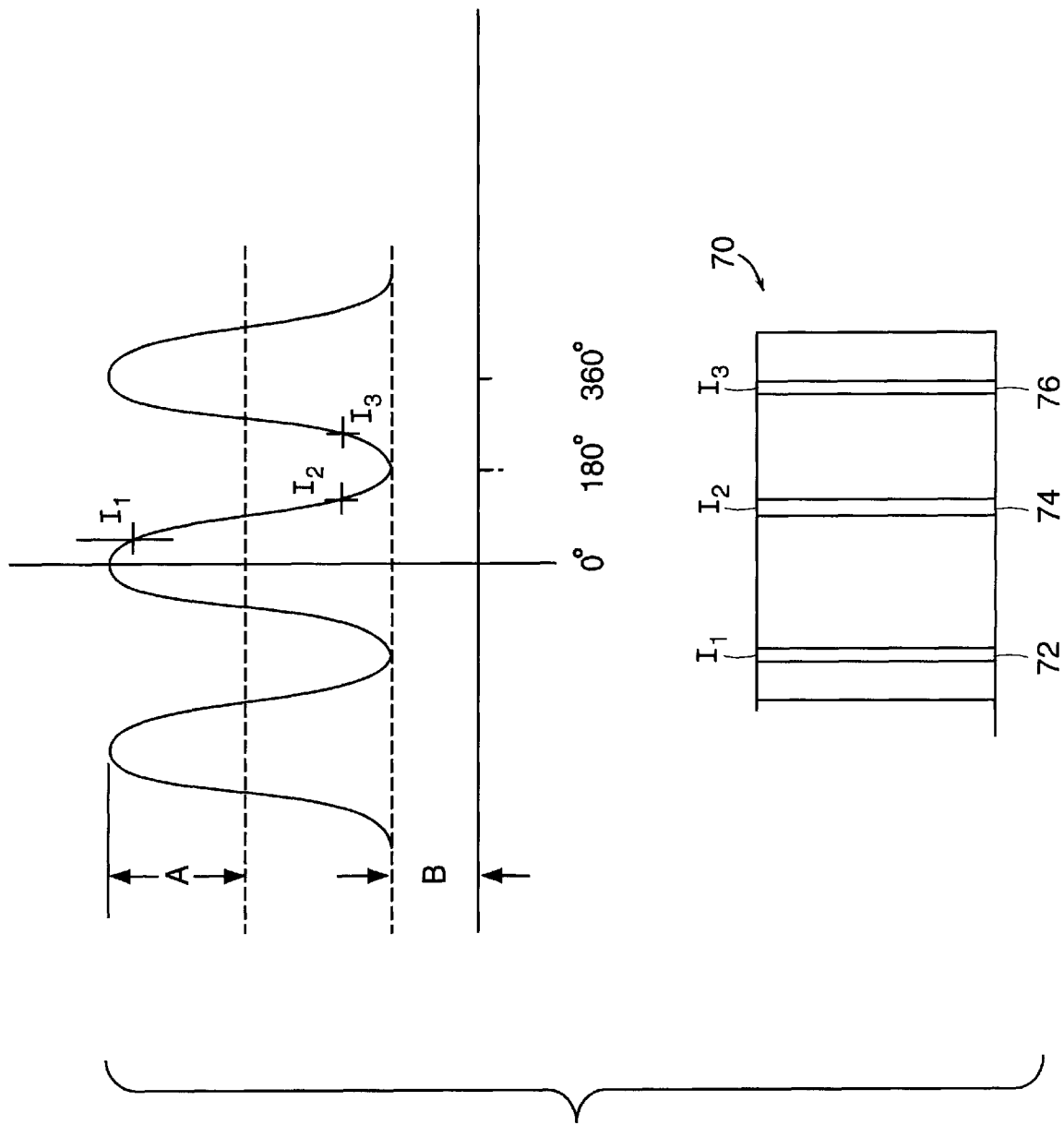
FIG. 4 is a diagram of the interference pattern generated by the embodiment of the interferometer of FIG. 3 as seen at the detector.

Referring to FIG. 4, although the embodiments described above have been discussed in terms of a single detector 14, increased resolution and the avoidance of the intensity ambiguity may be achieved by using a plurality of detectors. The intensity ambiguity arises because generally a given intensity occurs twice during a cycle and so it is not easy to determine from where in the periodic cycle of intensity (for example point $I_2$ or $I_3$) the signal is arising. By using a detector 70 having three parallel detecting elements 72, 74, 76 in the form of strips each separated from an adjacent strip by ¼ d, and orienting the strips parallel to the fringes, the ambiguity may be removed. Each strip 72, 74, 76 produces a signal ($I_1$, $I_2$, and $I_3$ respectively) proportional the intensity of optical radiation detected. The phase φ of the intensity cycle can be determined by the following relationship:

$$\phi = \tan^{-1}[(I_1 - I_3)/(2I_2 - I_1 - I_3)]$$

Thus the phase φ can be determined unambiguously within a range of 360°. Although this equation is strictly true only for strip widths of 0, it is a good approximation if the strip width is much less than the fringe period. The amount of deformation or displacement z is then given by the equation:

$$z = \phi d/(2\pi)$$

By using a multiple element detector, variations in the amplitude (A) of the intensity of the interference pattern caused by changes in the sources 10, 10' can be made to cancel out as can changes in the ambient light level or bias (B), as is seen from the equation defining φ.

Figure 4A:
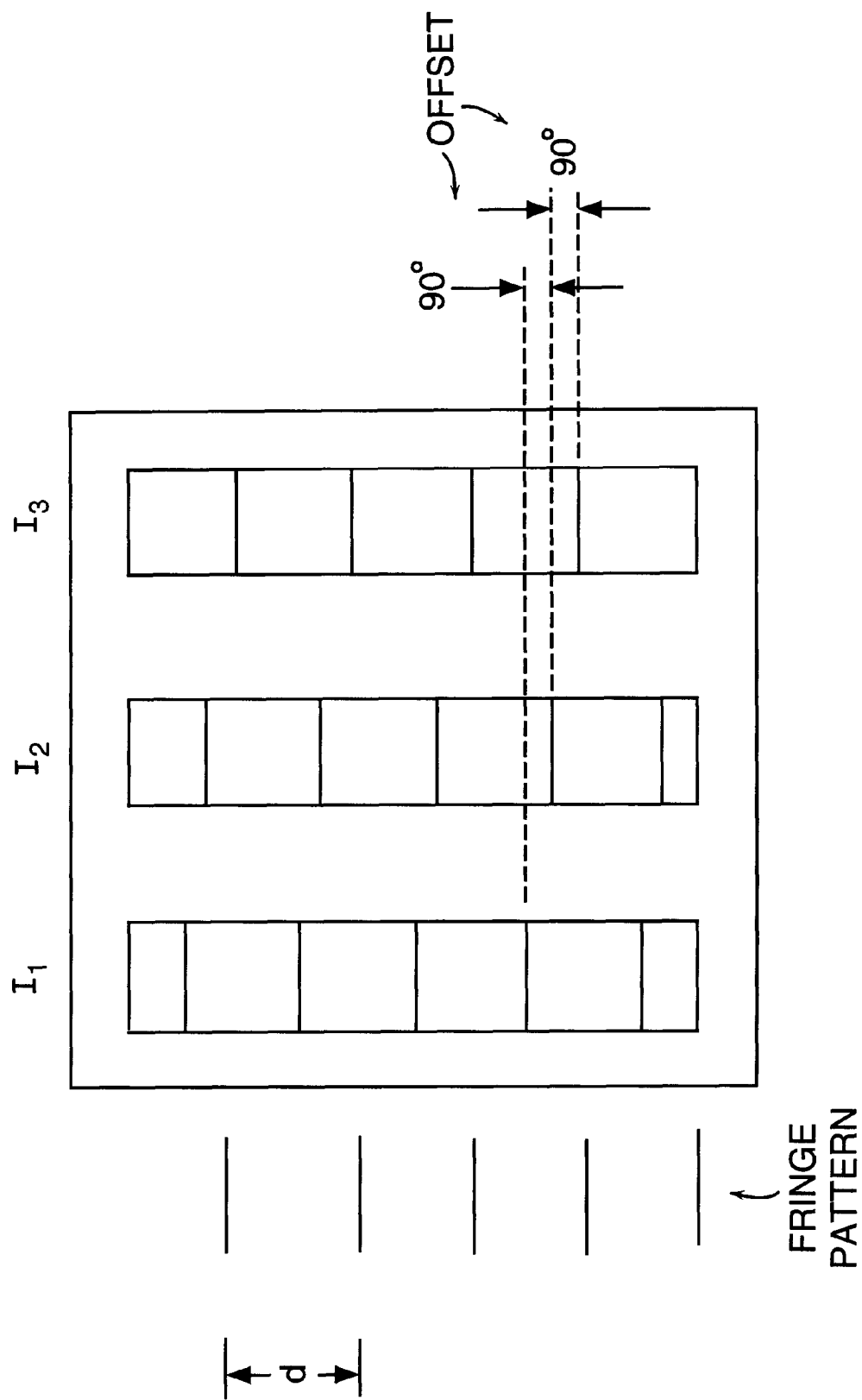
FIG. 4A is an embodiment of a strip element array used with masks.

Referring to FIG. 4A, it is also possible to create a detector whose strip elements are oriented perpendicular to the fringes. In such a case, each of the strip elements is masked so as to segment each strip into individual active areas. Each of the masks are offset by 90° with regard to the period of the fringe and with respect to each other. Such an arrangement thereby produces the same effect obtained by the three element detector described above, but with increased efficiency due to the larger overall active area. Alternatively, a two dimensional charge couple device array may be used.

Because both of the beams which form the interference pattern travel over nearly the same optical path, temperature gradients and atmospheric effects which do not cause a bending of the optical beams have a minimal effect on the measurement. Transverse temperature gradient ∂T/∂z, which causes a bending of the beam, affects the measurement of the deformation or displacement according to the equation:

$$\Delta z = \tfrac{1}{2} |\partial\eta/\partial T \partial T/\partial z| R^2$$

where Δz is the error in the measurement, ∂η/∂T is the change in the index of refraction with temperature, and ∂T/∂z is the transverse temperature gradient. To understand the magnitude of the error in measurement, consider for example with a propagation path (R) of 20 m, a change in the index of refraction with temperature (∂η/∂T) of 5.4×10⁻7/F.° and a transverse gradient (∂T/∂z) of 0.5° F/m. In such a case the error (Δz) will be about 50 μm.

In another embodiment, the detector is located adjacent to the source and the fringe pattern is projected onto a corner cube retroreflector located where the detector had been in the previous discussions. When the retroreflector receives the fringe pattern, the pattern is reflected back toward the detector which is adjacent the source. Such an arrangement has the attribute of not requiring electrical connections at both the source and retroreflector locations.

In yet another embodiment one or more detectors are illuminated by two widely separated independent fringe sources. In such a case, each fringe source may have a different wavelength each of which is selectable at the detector using an appropriate filter. This arrangement provides for a consistency check which is useful in the monitoring of fringe stability.

It is envisioned that the sources and detectors can be attached to a flexible tape or line to aid in placing them on the surface to be measured.

Having described the preferred embodiments of the invention, it will now become apparent to one of skill in the art that other embodiments incorporating the concepts may be used. It is felt, therefore, that these embodiments should not be limited to the disclosed embodiments but rather should be limited only by the spirit and scope of the following claims.

What is claimed is:

1. A non-contact metrology apparatus comprising:
   a detector;
   a non-collimated radiation intensity source generating a spatially varying radiation pattern of constant, noncircular polarization at said detector, said spatially varying radiation pattern being stationary with respect to said radiation intensity source;
   wherein said detector is positioned to receive said spatially varying radiation pattern of constant, noncircular polarization generated by said radiation intensity source at said detector, said detector generating an output signal in response to said spatially varying radiation intensity pattern of constant, noncircular polarization, one of said detector and said radiation intensity source being attached to a surface whose deformation or displacement is to be measured; and
   a signal processor in electrical communication with said detector, said signal processor determining the deformation or displacement of said surface in response to said detector output signal.

2. The apparatus of claim 1 wherein said radiation intensity source produces visible radiation.

3. The apparatus of claim 1 wherein said radiation intensity source is an interferometric source generating an interferometric pattern.

4. The apparatus of claim 3 wherein said interferometric source comprises:
   a light source; and
   a sheet of transmissive material positioned to intercept a beam of light from said light source, said sheet of transmissive material forming two beams of light.

5. The apparatus of claim 4 wherein said light source is a laser.

6. The apparatus of claim 1 wherein the detector comprises three strip detector elements.

7. The apparatus of claim 6 wherein each strip detector element is separated from an adjacent strip detector element by ¼ of the period of the interferometric pattern.

8. The apparatus of claim 1 wherein both said detector and said radiation intensity source are attached to said surface.

9. The apparatus of claim 1 further comprising a retroreflector positioned to receive said spatially varying radiation pattern generated by said radiation intensity source and to reflect said spatially varying radiation pattern to said detector.

10. The apparatus of claim 9 wherein said retroreflector is located on said surface to be measured.

11. The apparatus of claim 10 wherein neither said detector nor said radiation intensity source are positioned on said surface to be measured.

12. A method for the non-contact measurement of the deformation or displacement of a surface comprising the steps of:
    providing a detector;
    providing a non-collimated radiation intensity source generating a spatially varying radiation pattern of constant, noncircular polarization at said detector, said spatially varying radiation pattern of constant, noncircular polarization being stationary with respect to said radiation intensity source;
    placing one of said detector and said radiation intensity source at a location on said surface whose deformation or displacement is to be measured;
    receiving said spatially varying radiation pattern of constant, noncircular polarization at said detector, said detector generating an output signal in response to said spatially varying radiation pattern of constant, noncircular polarization; and
    calculating the deformation or displacement in said surface in response to the changes in the output signal of said detector.

13. The method of claim 12 wherein the step of providing a radiation intensity source comprises the step of providing an interferometric source generating an interferometric pattern.

14. The method of claim 13 wherein the step of providing an interferometric source generating an interferometric pattern comprises the step of directing a beam of light at a transmissive plate and transmitting at least a pair of light beams generated thereby.

15. The method of claim 12 wherein the step of placing at least one of said detector and said radiation intensity source at a location on said surface whose deformation or displacement is to be measured comprises the step of placing both said detector and said radiation intensity source at locations on said surface whose deformation or displacement is to be measured.

16. The apparatus of claim 1, wherein said radiation intensity source comprises a plurality of radiation intensity sources situated in close proximity to each other.

17. The non-contact metrology apparatus of claim 1, wherein
    said detector comprises a plurality of detectors; and
    said radiation intensity source comprises a plurality of radiation intensity sources.

18. The method of claim 12, wherein said detector comprises three-strip detector elements oriented perpendicularly to said spatially varying radiation pattern.

* * * * *